US 7,978,603 B2

(12) United States Patent  (10) Patent No.: US 7,978,603 B2
Eruchimovitch  (45) Date of Patent: Jul. 12, 2011

(54) TRAFFIC OPTIMIZATION IN A HETEROGENEOUS WIRELESS CABIN NETWORK

(75) Inventor: Baruch Eruchimovitch, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 11/548,237

(22) Filed: Oct. 10, 2006

(65) Prior Publication Data

US 2008/0084882 A1   Apr. 10, 2008

(51) Int. Cl.
*G01R 31/08* (2006.01)
*H04B 7/185* (2006.01)
*H04J 3/24* (2006.01)
*H04J 3/16* (2006.01)
*H04L 12/28* (2006.01)
*H04L 12/56* (2006.01)
*G06F 15/16* (2006.01)
*G06F 15/173* (2006.01)

(52) U.S. Cl. ............... 370/230.1; 370/316; 370/349; 370/395.21; 370/474; 709/227; 709/236; 709/238

(58) Field of Classification Search .......... 370/392, 370/316, 349, 395.21, 474; 709/227, 236, 709/238
See application file for complete search history.

(56) References Cited

U.S. PATENT DOCUMENTS

| 6,560,219 | B1 * | 5/2003 | Tabu et al. .................. 370/352 |
| 7,113,780 | B2 | 9/2006 | McKenna et al. |
| 7,580,350 | B1 * | 8/2009 | Parker ........................ 370/230 |
| 2002/0101831 | A1 * | 8/2002 | Gutman et al. ............. 370/316 |
| 2002/0157005 | A1 * | 10/2002 | Brunk et al. ................ 713/176 |
| 2003/0041155 | A1 | 2/2003 | Nelson et al. |
| 2004/0258058 | A1 * | 12/2004 | Heston et al. .............. 370/389 |
| 2006/0221939 | A1 * | 10/2006 | Rosen et al. ............... 370/352 |
| 2006/0274737 | A1 * | 12/2006 | Liu et al. .................... 370/389 |
| 2007/0217370 | A1 * | 9/2007 | Soong et al. ............... 370/337 |
| 2008/0069148 | A1 * | 3/2008 | Wu ............................. 370/498 |

FOREIGN PATENT DOCUMENTS

EP   0932265 A2   7/1999

(Continued)

OTHER PUBLICATIONS

Information Science Institute: "Internet Protocol, DARPA Internet Program Protocol Specification," RFC 791, The Internet Engineering Task Force (IETF) Request for Comments, pp. 1-49, Sep. 1981.

(Continued)

*Primary Examiner* — Alpus H Hsu
*Assistant Examiner* — Saad Hassan
(74) *Attorney, Agent, or Firm* — Abdollah Katbab; Darren M. Simon

(57) ABSTRACT

A method for transmitting signals, consisting of receiving a plurality of signals generated in an isolated region, the signals encoding respective individual payloads and payload envelopes. At least two of the signals operate under different protocols. The method includes deriving information from the signals on respective connections of the signals, and aggregating the payloads into one or more aggregated payloads. The method further includes transmitting the one or more aggregated payloads and the information via a satellite link to a receiver outside the region, the one or more aggregated payloads and the information amounting to less data than an aggregated amount of data in the individual payloads and payload envelopes. The method also includes reconstituting the plurality of signals at the receiver using the one or more aggregated payloads and the information.

36 Claims, 5 Drawing Sheets

FOREIGN PATENT DOCUMENTS

| | | |
|---|---|---|
| EP | 1316160 A1 | 6/2003 |
| EP | 1526654 A1 | 4/2005 |
| WO | WO9603846 A1 | 2/1996 |

OTHER PUBLICATIONS

International Search Report and Written Opinion—PCT/US2007/080721, International Search Authority—European Patent Office—Mar. 26, 2008.

Postel: "User Datagram Protocol," RFC 768, The Internet Engineering Task Force (IETC) Request for Comments, Information Science Institute, pp. 1-3, Aug. 28, 1980.

RFC 793, "Transmission Control Protocol Darpa Internet Program Protocol Specification", (Sep. 1981).

Schulzrinne et al. "RTP: A Transport protocol for Real-Time Applications", Jan. 1996, IETF RFC 1889, entire document.

\* cited by examiner

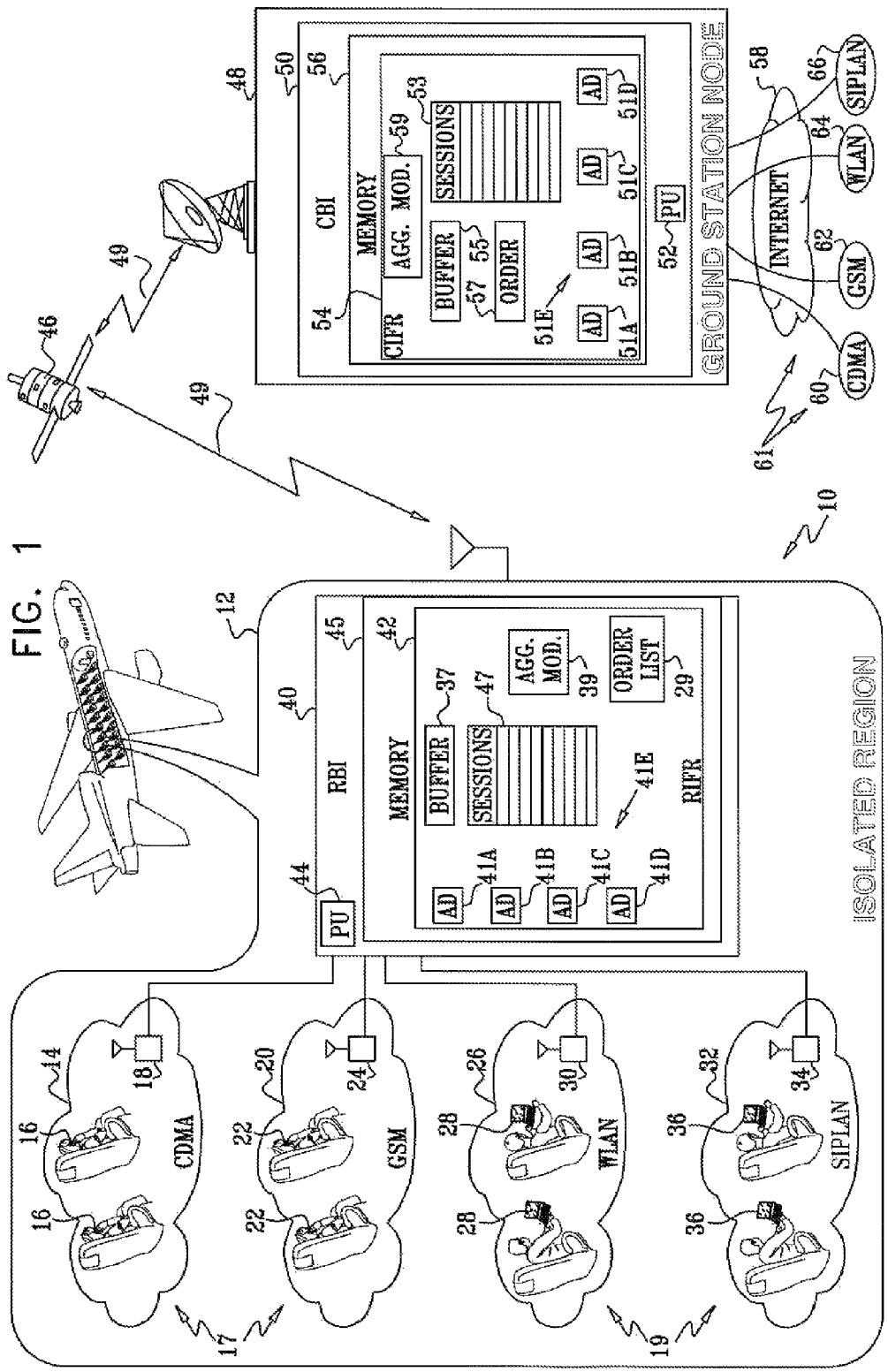

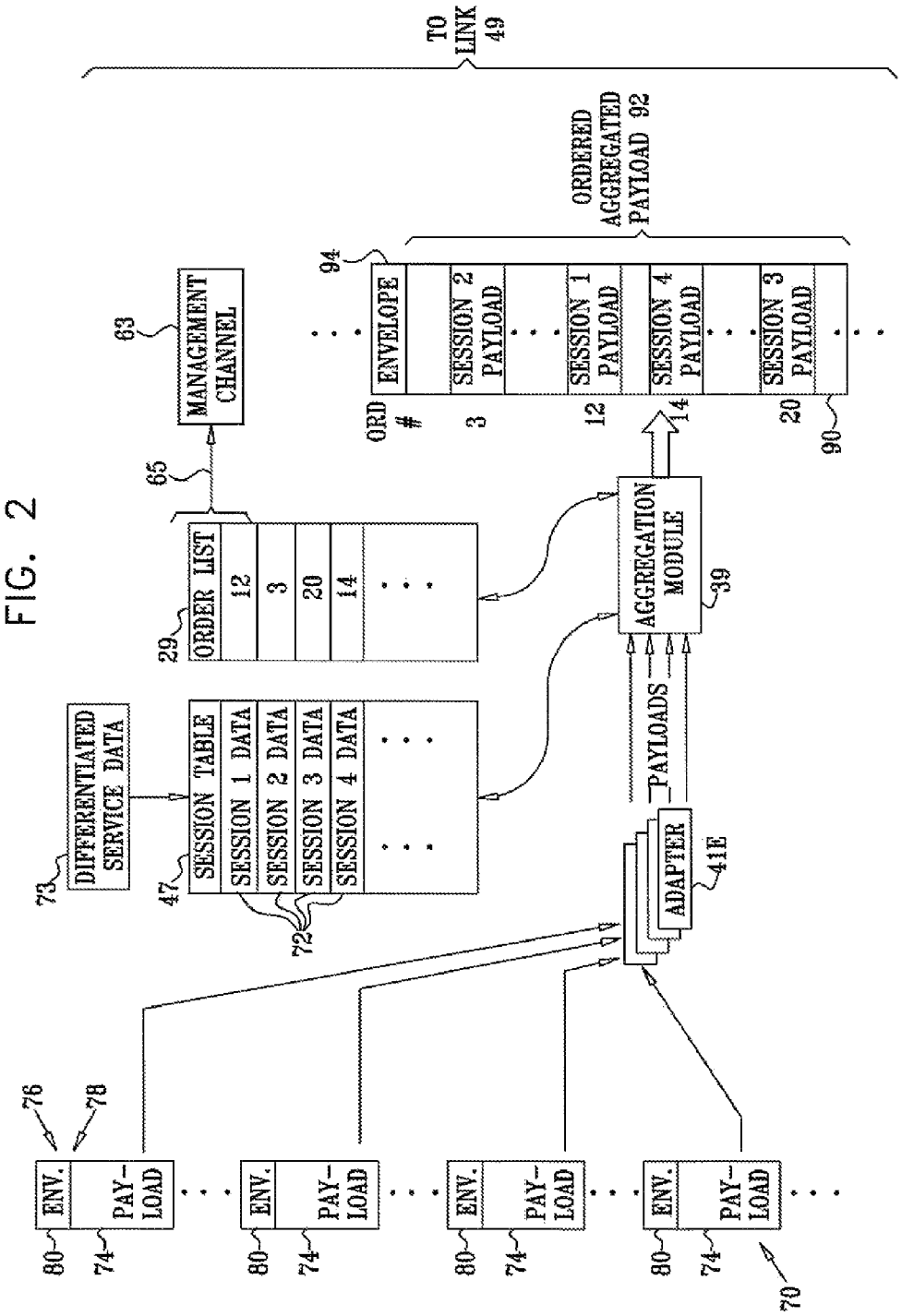

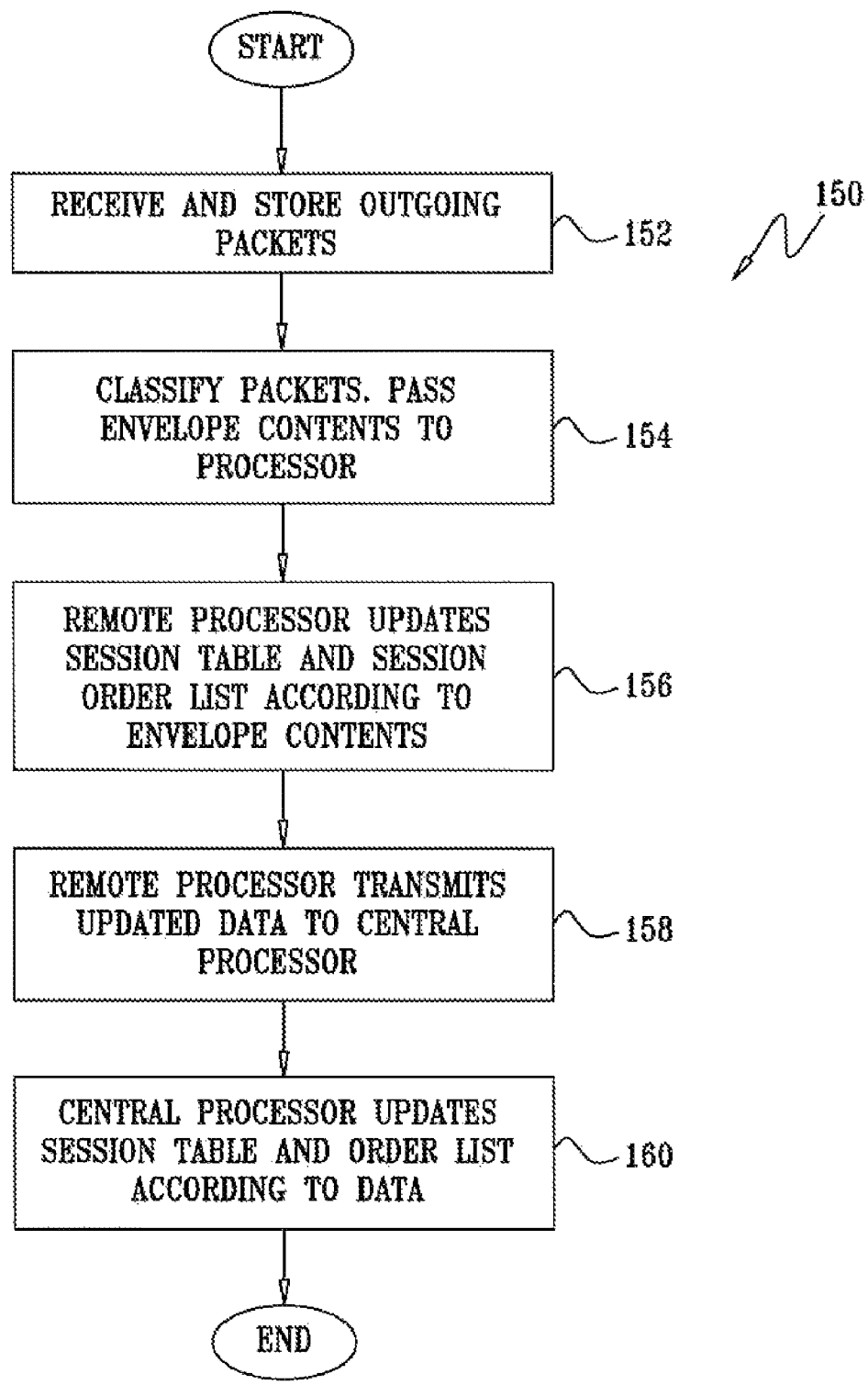

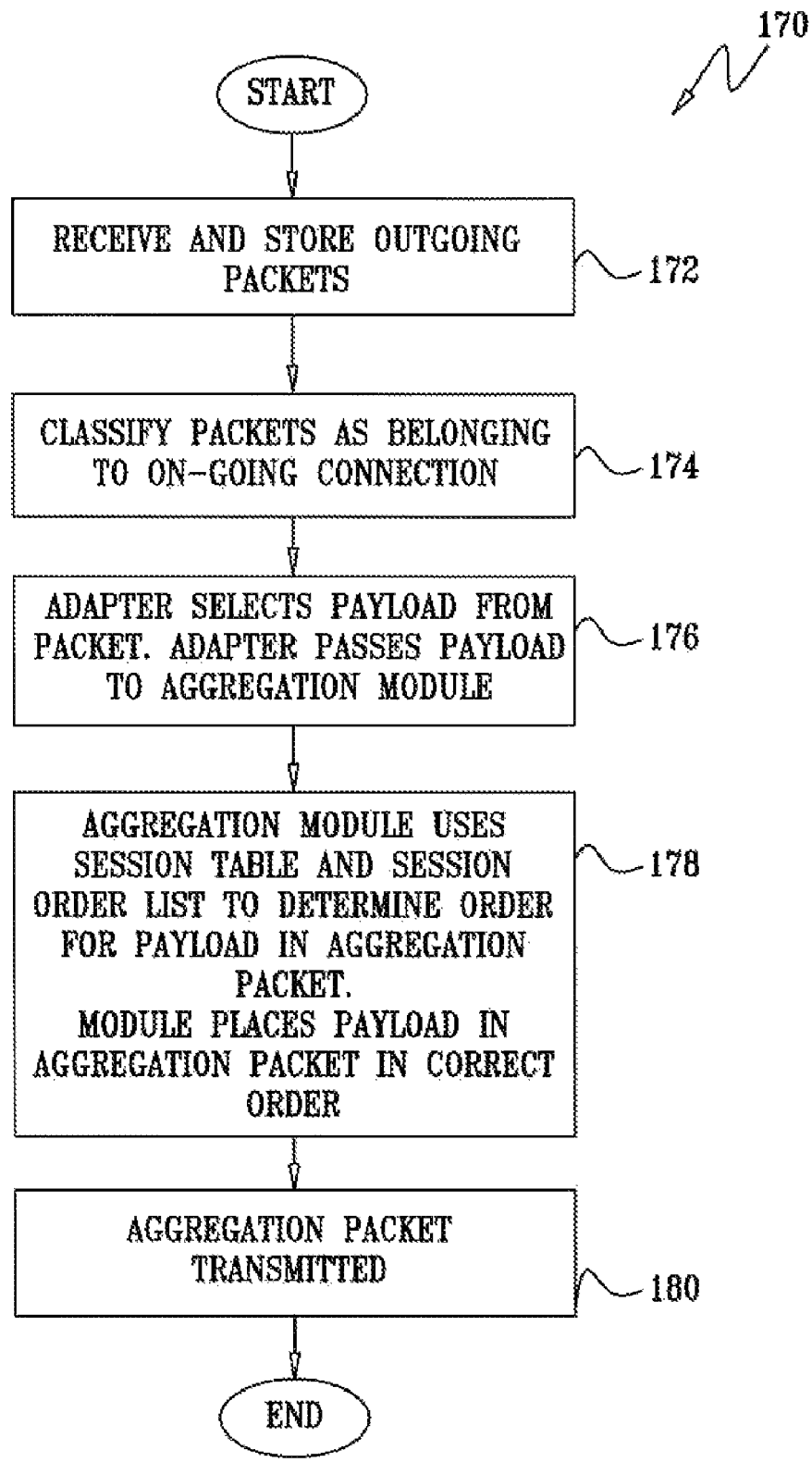

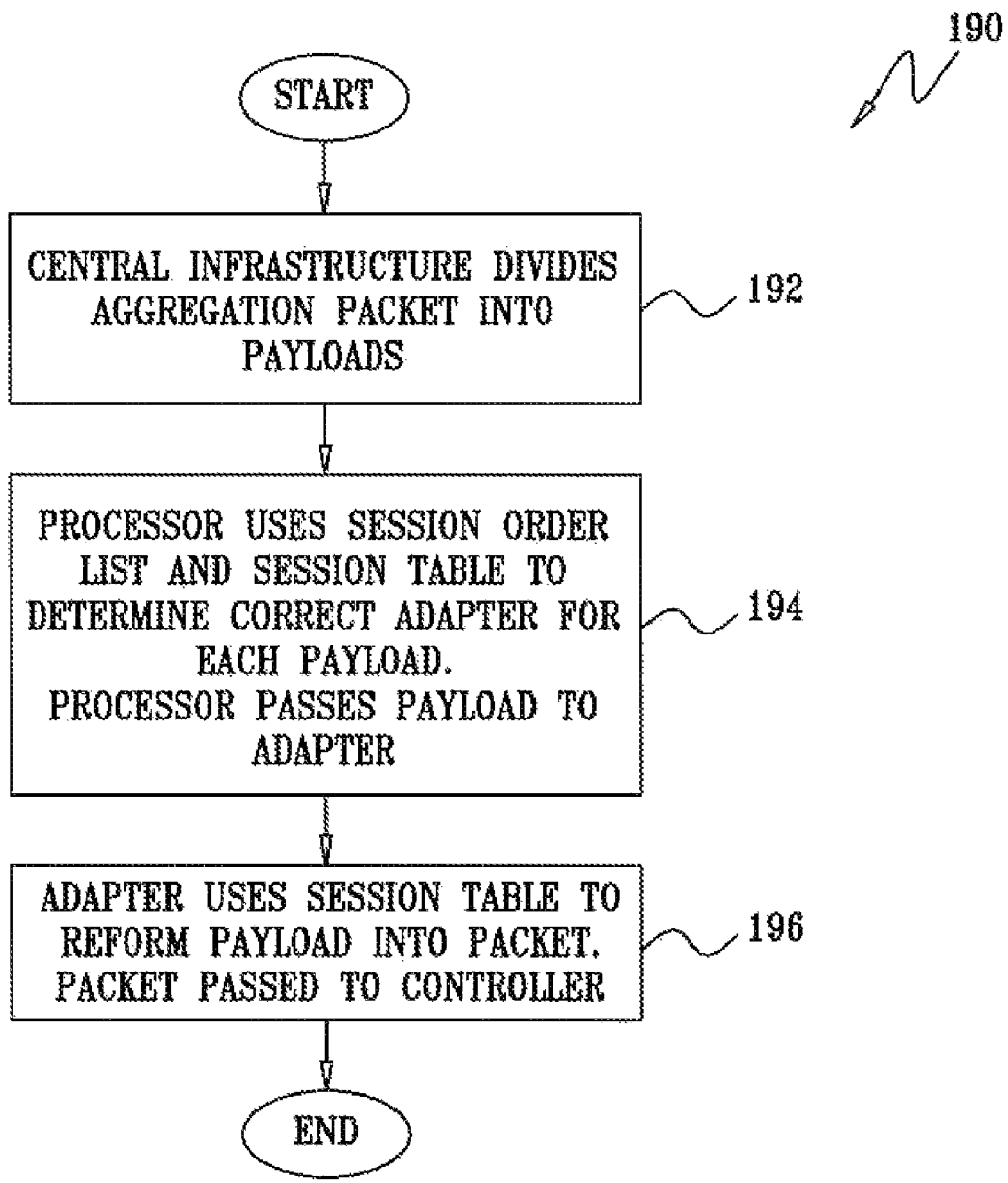

TRAFFIC OPTIMIZATION IN A HETEROGENEOUS WIRELESS CABIN NETWORK

FIELD OF THE INVENTION

The invention relates generally to signal transmission, and specifically to transmission of multiple types of signals between an isolated region and a station outside the region.

BACKGROUND OF THE INVENTION

In passenger aircraft, there is typically a large number of different types of wireless signals originating from, and being directed to, the passengers and/or crew. Some of these signals are internal to the aircraft, but typically most are between the aircraft and an entity external to the aircraft. The signals may be classified as voice communications, or as data communications.

Both types of communication are typically transmitted as packets using various protocols such as the Internet Protocol (IP), the User Datagram Protocol (UDP), the Transmission Control Protocol (TCP), and/or the Real-Time Transport Protocol (RTP). These protocols are respectively described in Request For Comments (RFC) documents RFC 791, RFC 768, RFC 793, and RFC 1889, which may be found at www-.faqs.org/rfcs/, and which are incorporated herein by reference. Voice communications are also transmitted using specific cellular telephone protocols, such as a Code Division Multiple Access (CDMA) protocol, a global system for mobile (GSM) protocol, and/or various orthogonal frequency division multiplexing (OFDM) protocols.

The communications external to the aircraft are typically transmitted via links which are limited in bandwidth, and the bandwidth limitation causes problems, such as dropped data connections, long voice call setup times, and reduced voice quality. While some solutions to the problems caused have been found, for example, the application of a differentiated services architecture, the solutions are at best partial fixes for the problems.

Thus, an improved method for transmitting traffic from an isolated system such as an aircraft cabin would be advantageous.

SUMMARY OF THE INVENTION

In embodiments of the invention, a multiplicity of heterogeneous wireless communication networks operate in an isolated region, such as an aircraft cabin, are described. The isolated region communicates with an external station, typically a ground station node, by a satellite link which enables each of the heterogeneous networks to communicate with a corresponding network coupled to the external station.

The wireless communications of the isolated region networks are transmitted as packets, each of the packets comprising a payload enclosed in an envelope. For each network, the payload and the envelop characteristics of each transmitted packet are prescribe by one or more predefined protocols under which the network operates. An infrastructure in the isolated region receives packets of on-going connections; the infrastructure extracts the payloads from the packets, assembles the payloads into an ordered aggregated packet, and transmits the ordered packet to the external station. In some embodiments the ordered packet may be compressed.

At initiation of connections, the infrastructure stores respective information regarding the connections. The infrastructure also assigns a unique identifier, such as an order number, to each connection, according to which payloads of each connection are assembled in the aggregated packet. The infrastructure transmits the information and the order numbers, optionally in a compressed form, to the external station. The infrastructure may also apply a differentiated service parameter, such as a quality of service (QoS), to each connection.

On receipt of the aggregated packet, the external station divides the packet into the payloads. The external station uses the information and order number received from the infrastructure to reconstitute the original packets from their payloads, which the external station then transmits to their final destination in the corresponding networks. By separating payloads from their envelopes, and transmitting the payloads as an ordered aggregated packet, significant savings in bandwidth are realized.

By processes substantially similar to those described above, the external station also receives inbound packets destined for the isolated region from the networks coupled to the external station, and generates reduced size inbound aggregated packets. These reduced size packets are conveyed via the satellite link to the isolated region infrastructure, which converts them to their original form inbound packets. The isolated region infrastructure then conveys the original form inbound packets to their correct destinations in the isolated region.

Thus, both outbound and inbound packets are transmitted in a reduced size form via the satellite link, so that the transmission bandwidth with the isolated region is correspondingly increased.

There is therefore provided, according to an embodiment of the invention, a method for transmitting signals, including:
  receiving a plurality of signals generated in an isolated region, the signals encoding respective individual payloads and payload envelopes, at least two of the signals operating under different protocols;
  deriving information from the signals on respective connections of the signals;
  aggregating the payloads into one or more aggregated payloads;
  transmitting the one or more aggregated payloads and the information via a satellite link to a receiver outside the region, the one or more aggregated payloads and the information totaling less data than an aggregated amount of data in the individual payloads and payload envelopes; and
  reconstituting the plurality of signals at the receiver using the one or more aggregated payloads and the information.

Typically, the isolated region may include a moving region.

Deriving the information from the signals may include deriving the information from the payload envelopes, and aggregating the payloads may include incorporating a portion of the respective payload envelope into the payload.

In an embodiment, deriving the information includes storing the information in a session table at the isolated region, and transmitting the information includes storing the session table at the receiver.

In an alternative embodiment, aggregating the payloads includes assembling the payloads in a specific order into the one or more aggregated payloads, transmitting the information includes transmitting the specific order to the receiver, and the specific order references the respective connections.

In another embodiment, receiving the plurality of signals includes receiving and applying a quality of service (QoS) parameter for at least one of the signals, and the method also includes applying at least one of respective priorities and respective bandwidths to the at least two signals, in response to the QoS parameter.

In another disclosed embodiment, the payloads have fixed lengths; alternatively, the payloads have variable lengths, and aggregating the payloads includes incorporating values of the length into the aggregated payload.

Typically, the different protocols are chosen from industry-standard protocols.

There is further provided, according to an embodiment of the invention, apparatus for transmitting signals, consisting of:
- a remote backhaul infrastructure (RBI) which is adapted to:
  - receive a plurality of signals generated in an isolated region, the signals encoding respective individual payloads and payload envelopes, at least two of the signals operating under different protocols,
  - derive information from the signals on respective connections of the signals,
  - aggregate the payloads into one or more aggregated payloads, and
  - transmit the one or more aggregated payloads and the information via a satellite link, the one or more aggregated payloads and the information consisting of less data than an aggregated amount of data in the individual payloads and payload envelopes; and
- a receiver outside the region which is adapted to receive the one or more aggregated payloads and the information and to reconstitute the plurality of signals therefrom.

The invention will be more fully understood from the following detailed description of the embodiments thereof, taken together with the drawings, a brief description of which is given below.

BRIEF DESCRIPTION OF THE DRAWINGS

FIG. 1 is a schematic illustration of a communication system, according to an embodiment of the invention;

FIG. 2 illustrates a relation between packets transmitted in the system of FIG. 1, and an aggregated packet generated by the system, according to an embodiment of the invention;

FIG. 3 is a flowchart showing steps of a process performed on initiation or teardown of a connection, according to an embodiment of the invention;

FIG. 4 is a flowchart showing steps of a process performed during an on-going connection conducted via a satellite, according to an embodiment of the invention; and FIG. 5 is a flowchart showing steps of a process performed on receipt of a specific aggregation packet, according to an embodiment of the invention.

DETAILED DESCRIPTION OF EMBODIMENTS

Reference is now made to FIG. 1, which is a schematic illustration of a communication system 10, according to an embodiment of the invention. System 10 comprises one or more isolated regions 12, which are typically mobile regions such as aircraft cabins, although it will be appreciated that each region 12 may be any other isolated region wherein electromagnetic radiation generated within the region does not radiate significantly beyond the boundaries of the region. Such regions include, but are not limited to, ships, islands, and isolated habitations. Except where otherwise stated, by way of example region 12 is hereinbelow assumed to be an aircraft cabin.

Two or more heterogeneous wireless communication systems, i.e., electromagnetic signaling systems that operate under different protocols, are implemented within cabin 12. Typically the protocols are industry-standard protocols. Herein, it is assumed that the following four systems are operative in the cabin: a code division multiple access (CDMA) cellular telephone system 14, which has one or more CDMA mobile stations 16 communicating via a local CDMA base-station transceiver system (BTS) 18; a global system for mobile (GSM) cellular telephone system 20, which has one or more GSM mobile stations 22 communicating via a local GSM BTS 24; a wireless local area network (WLAN) data communication network 26 which has one or more computing systems 28 having communications controlled by a local controller 30; and a session initiated protocol LAN (SIPLAN) 32 which has one or more computing systems 36 having communications controlled by a local controller 34. It is contemplated that many other transmission schemes and/or protocols could be used, as OFDM protocols, various 802.xx protocols (such as 802.11, 802.16, 802.20, 802.15 . . . ). SIPLAN 32 may operate as either a wired or as a wireless network.

Hereinbelow, stations 16 and 22, and systems 28 and 36 are also referred to collectively as remote stations 17. BTS 18, BTS 24, controller 30, and controller 34 are also referred to hereinbelow collectively as remote controllers 19.

In addition to controlling their respective local communications, all remote controllers 19 are coupled, typically by wireline, to a remote backhaul infrastructure (RBI) 40. RBI 40 acts as a conduit for communications between the wireless/wired communication systems within cabin 12 and corresponding systems outside the cabin, such as ground-based systems. These communications are herein termed external communications. In order to act as a conduit, RBI 40 uses respective protocol-specific adapters, the functions of which are described in more detail below. Thus, in the example described herein, RBI 40 has a CDMA adapter 41A, a GSM adapter 41B, a WLAN adapter 41C and a SIPLAN adapter 41D; the adapters are also referred to generically as adapters 41E.

In order to provide the necessary linkage for the external communications, a satellite 46, typically a transponder, acts as a signal relay for a satellite link 49 between RBI 40 and ground station node 48. Ground station node 48 comprises a central backhaul infrastructure (CBI) 50, which is coupled via a network 58 such as the Internet to corresponding networks/communication systems, and which also acts as a conduit for communications with cabin 12. CBI 50 is generally similar to RBI, and includes protocol-specific adapters generally similar in function to adapters 41E. Thus, CBI 50 has a CDMA adapter 51A, a GSM adapter 51B, a WLAN adapter 51C and a SIPLAN adapter 51D; these adapters are also referred to generically as adapters 51E. Consequently, CDMA system 14, GSM system 20, WLAN network 26, and SIPLAN 32 are able to communicate respectively with a CDMA system 60, a GSM system 62, a WLAN network 64, and a SIPLAN 66. Stations operating within CDMA system 60, GSM system 62, WLAN network 64, and SIPLAN 66 are generically termed ground stations 61.

Typically, satellite 46 also acts as a relay between other isolated region RBIs, generally similar to cabin 12, and ground station node 48. In some embodiments of the invention, a multiplicity of satellites act as satellite 46. Thus, while the description herein, by way of example, refers to one region 12 communicating via one satellite 46, it will be understood that the scope of the invention includes more than one isolated region and/or more than one satellite.

RBI 40 comprises a processing unit (PU) 44, which operates the remote infrastructure using a memory 45 incorporating a remote integration framework (RIFR) module 42. Module 42 comprises a session table 47, a session order list 29, an aggregation module 39, a buffer 37, and adapters 41E.

CBI 50 comprises a PU 52, which operates the central infrastructure using a memory 56 which incorporates a central integration framework (CIFR) module 54. Module 54 in turn comprises a session table 53, a session order list 57, an aggregation module 59, a buffer 55, and adapters 51E.

Tables 47 and 53 are substantially identical single column tables which contain information on communication sessions in progress between RBI 40 and CBI 50. Lists 29 and 57 are substantially identical lists having the order in which session payloads are placed in aggregated packets generated by modules 39 and 59. Aggregation module 59 and adapters 51E perform similar functions to module 39 and adapters 41E respectively. The functions of tables 47, 53, lists 29, 59, modules 39, 59, buffers 37, 55, and adapters 41E, 51E, are described in more detail below.

Embodiments of the invention reduce the bandwidth limitation problems described in the Background of the Invention by optimizing and compressing the external communications in an outbound direction from cabin 12, as well as in an inbound direction to the cabin. Thus RBI 40 optimizes and compresses heterogeneous wireless signals received from cabin 12 to form compacted outbound signals. RBI 40 then transmits the compacted signals to CBI 50, which reconstitutes the signals to their original form and conveys the reconstituted outbound signals to their appropriate systems/networks. CBI 50 and RBI 40 perform substantially the same operations on inbound heterogeneous wireless signals that are received at ground station node 48 and that are directed to cabin 12. The process of generating the outbound and inbound compacted signals is described below with respect to FIGS. 2, 3, 4 and 5.

FIG. 2 illustrates a relation between packets 70 transmitted to RBI 40 from controllers 19, and aggregated packets 90 generated by RBI 40, according to an embodiment of the invention. The processes by which aggregated packets 90 are generated from packets 70 are described below in reference to FIGS. 3 and 4. Traffic to and from remote stations 17 is assumed to be in the form of packets, each packet 70 comprising a payload 74 and an envelope 80 typically formed from a header 76 and a trailer 78. Envelope 80 of each packet comprises information necessary for successful delivery of the packet to its destination. The contents and structure of each envelope 80 depend on the type of traffic from a specific remote station 17, for example whether the traffic is classified as part of an ongoing voice or data connection, and/or as part of a reliable or an unreliable connection. The contents and structure of each envelope 80 are also a function of the one or more protocols under which remote station 17 is operating. By way of example, packets to and from remote stations 17 are assumed to be transmitted using an Internet Protocol (IP), but it will be appreciated that any other suitable protocol may be used for packet transmission. It will also be appreciated that packets may use other protocols, such as those exemplified in the Background of the Invention, as well as the Internet Protocol, the protocols used contributing data to each envelope 80.

Packets 70 may be grouped into a number of different classifications, for example, station registration packets, connection setup packets, on-going connection packets, and tear-down connection packets, as well as other classifications that will be apparent to those skilled in the art. Depending on their classification, each envelope 80 of packets transmitted to and from each remote station 17 typically comprises data that is repeated. For example, in an ongoing RTP/UDP/IP connection, repeating data in each envelope of the ongoing connection comprises, inter alia, a source address and port, and a destination port and address. Depending on the classification of the packet, the repeating data may comprise a relatively large fraction of the total envelope.

Embodiments of the invention use the presence of repeated data in the envelopes of the packets, together with the fact that the information within the packets is to be transferred between two known infrastructures, i.e., RBI 40 and CBI 50, to reduce the amount of data transmitted between the infrastructures over satellite link 49. The repeated data is stored as session entries 72 of session table 47.

Each session entry 72 of session table 47 gives information regarding a specific connection upon which a subgroup of packets 70 are transmitted. By way of example, table 47 is illustrated as having four information entries labeled session data 1, 2, 3, and 4. Each entry 72 may also include a differentiated service data parameter 73, such as a quality of service (QoS), a type of service (ToS) value, and/or a traffic shaping value, that is assigned to the connection of the entry. The differentiated service data parameter may typically be generated by an operator of system 10. For example, the differentiated service parameter may provide a higher priority and/or larger bandwidth to a remote station 17 situated in a first class region of cabin 12, compared to one situated in an economy class region. Typically, connections such as voice or video connections that require real-time transmission are assigned a higher priority than connections which may be successfully operated in non-real-time. Alternatively, the differentiated service data parameter may be applied within system 10 by any other convenient method known in the art.

As illustrated in FIG. 2, RBI 40 receives packets 70, and transfers the packets to their appropriate adapter 41E. For packets that are part of an on-going connection, each adapter 41E transfers payload 74 of the packet to aggregation module 39. Module 39 acts as a buffer for the payloads and also generates aggregated packets 90 that are transmitted from RBI 40.

Each aggregated packet 90 comprises an aggregated payload 92 and an envelope 94; module 39 is assumed, by way of example, to generate aggregated packets 90 to be compatible with the Internet Protocol, so that envelopes 94 are constructed accordingly. However, any other convenient protocol which is able to convey aggregated payload 92 from RBI 40 to CBI 50 via satellite link 49 may be used. Module 39 assembles aggregated payload 92 in the form of ordered payloads 74, the ordering of payloads 74 being derived from a unique order number which processor 44 establishes during call setup, and which the processor stores in session order list 29. Module 39 refers to list 29 to decide the order in which payloads 74 are placed in aggregated payload 92. In FIG. 2, by way of example processor 44 is assumed to have assigned the order numbers 12, 3, 20, and 14 respectively to session 1 data, session 2 data, session 3 data, and session 4 data, as shown in list 29. Payload 92 is shown as using the order numbers derived from list 29.

Typically, each payload 74 has a fixed length which is established using a management channel (described further below) between RBI 40 and CBI 50. Alternatively or additionally, at least some of payloads 74 inserted into aggregated payload 92 may have a variable length. In the latter case, the length of the payload is typically passed with the payload as one of a number of predefined lengths. In some embodiments of the invention, aggregated payload 92 may be compressed, typically using a compression algorithm such as a Lempel- Ziv-Welch (LZW) algorithm. Alternatively or additionally, other forms of compression to individual payloads and/or the aggregated payload may be applied, such as checking for a level and/or duration of silences in voice data being sent, and compressing the data corresponding to such silences. After formation of each aggregated packet 90, module 39 passes the assembled packet to RBI 40 for transmission to satellite 46 via link 49.

In addition to transmitting aggregated packets 90, link 49 also comprises a management channel 63 over which data may be passed between RBI 40 and CBI 50. The data may also be passed in a compressed form. Functions of channel 63 are described in more detail below.

FIG. 3 is a flowchart showing steps of a process 150 performed by RBI 40 on initiation or teardown of a connection, according to an embodiment of the invention. The steps described herein apply to a connection via satellite 46 that is initiated or torn down due to transmissions from within cabin 12. Those skilled in the art will be able to apply the steps described herein, mutatis mutandis, to a connection via satellite 46 that is initiated or torn down due to transmissions from systems 61.

In a first step 152, remote controllers 19 transmit outgoing packets 70 received from their respective remote stations 17 to RBI 40. RIFR module 42 receives packets 70, stores them temporarily in its incoming buffer 37, and then passes the packets to the appropriate adapters 41E.

In a classification step 154, each adapter 41E inspects the packet envelope and determines that the packet is related to initiation or teardown of a connection. The adapter passes the content of the envelope to processor 44.

In an updating step 156, processor 44 updates session table 47 according to the envelope contents received. Thus, if the envelope contents correspond to initiation of a connection, processor 44 stores the information for the connection, derived from the envelope contents, in session table 47. The information stored typically includes addresses of specific remote stations 17 and ground stations 61 between which the connection is to be initiated. Alternatively, if the envelope contents correspond to teardown of a connection, processor 44 removes the information for the connection from session table 47.

Also in step 156, processor 44 updates session order list 29. Thus if table 47 has had a connection added, processor 44 adds an order number for the connection to list 29. If table 47 has had a connection torn down, list processor 44 removes the order number of the connection from list 29.

In a coordination step 158, RBI 40 transmits the updated data for session table 47 and list 29 to CBI 50, using management channel 63 between the RBI and the CBI, and as illustrated by arrow 65 (FIG. 2). Typically, the management channel uses a reliable connection such as a TCP/IP transmission, and may use any convenient protocol, including non-standard protocols, for transferring the communications.

In a final step 160, processor 52 uses the updated data to update session table 53 and list 57 of CBI 50, so that session tables 47 and 53, and lists 29 and 57, are substantially identical. Process 150 then concludes.

FIG. 4 is a flowchart showing steps of a process 170 performed by RBI 40 during an on-going connection conducted via satellite 46, according to an embodiment of the invention. The steps described herein are those performed within cabin 12 for outbound packets 70 on the on-going connection, and correspond to the process illustrated in FIG. 2. Those skilled in the art will be able to apply the steps described herein, mutatis mutandis, to steps performed within CBI 50 for inbound packets during an on-going connection conducted via satellite 46.

First step 172 and classification step 174 are generally similar to steps 152 and 154 of process 150, except that in step 174 each adapter 41E classifies the packet as part of an on-going connection.

In a step 176, the adapter selects payload 74 (FIG. 2) from the packet 70 it has received, and passes the payload to aggregation module 39. The payload selected and passed typically depends on the type of connection. Thus, for an unreliable connection such as that used by a UDP packet, the payload comprises all data except the envelope of the packet. For a reliable connection, such as that used by a TCP/IP packet, the payload also includes data selected from the envelope, such as a number of the packet, that may be necessary for correct continuation of the connection.

In a step 178, aggregation module 39 checks with session table 47 to determine on which connection the payload is to be delivered, and from order list 29 the module determines the order in which the payload is to be placed in aggregation packet 90 sent from the module. The aggregation module then places the payload into the aggregation packet in the order it has determined, forming aggregated payload 92.

In a final step 180, when a specific aggregation packet 90 has been filled, or after a preset time, whichever occurs first, the aggregation module passes the aggregation packet 90 to processor 44, which transmits the packet via satellite 46 to CBI 50. Process 170 then ends.

FIG. 5 is a flowchart showing steps of a process 190 performed by CBI 50 on receipt of a specific aggregation packet 90, according to an embodiment of the invention. Those skilled in the art will be able to apply the steps described herein, mutatis mutandis, to steps performed by RBI 40 on receipt of an aggregation packet.

In a first step 192, CBI 50 receives aggregation packet 90, stores it in its buffer 55, and divides the aggregation packet into its payloads. The division is performed using knowledge of the lengths of the payloads, which typically have the preset fixed length described above. In the cases where the payload length is not fixed, the length is passed with the payload and is included in aggregation packet 90, as is also described above. In these cases, CBI 50 uses the values of the length to correctly divide aggregation packet 90 into its payloads.

In a second step 194, processor 52 refers to order list 57 and session table 53. From the list and the table, processor 52 determines to which adapter 51E each payload is to be sent, and forwards the payloads accordingly. (As stated above, session tables 47 and 53, and lists 29 and 57, are substantially identical).

In a final step 196, each adapter uses the session information in table 53 to reconstitute the complete packet of the payload. The adapter then forwards the complete packet, via its respective network, to the appropriate ground station 61. Process 190 then concludes.

The descriptions above with reference to FIGS. 2, 3, 4 and 5 have described the process of transfer of outbound packets from region 12 to ground station node 48, and from the ground station node to the final destination of the packets. It will be appreciated that in the transfer of the outbound packets, the amount of data transmitted via link 49 is significantly less than the amount of data in the outbound packets themselves, since the packets are compressed into aggregated packets and information transmitted via management channel 63. The reduction in data transmitted leads to a corresponding increase in bandwidth.

Generally similar processes to those described above are followed for inbound packets from networks 60, 62, 64, and 66 to region 12, and those skilled in the art will be able to adapt the processes described herein, mutatis mutandis, to apply to inbound packets.

It will be appreciated that the embodiments described above are cited by way of example, and that the invention is not limited to what has been particularly shown and described hereinabove. Rather, the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A method for transmitting signals, comprising:
    receiving a plurality of signals generated in or destined for an isolated region, at least two of the plurality of signals operating under different protocols, the plurality of signals, the signals encoding data packets comprising respective individual payloads and payload envelopes, wherein at least one of the payload envelopes comprises header data that is repeated in at least another one of the payload envelopes;
    deriving a session entry for each set of the repeated header data from the payload envelopes, wherein each of the session entries comprises information regarding a connection upon which a subgroup of the data packets is transmitted;
    aggregating the payloads, separated from the respective data packets, into one or more aggregated payloads; and
    transmitting the one or more aggregated payloads and the session entries via a satellite link to a receiver, wherein the receiver comprises a destination outside the isolated region or comprises the isolated region, the one or more aggregated payloads and the session entries comprising less data than an aggregated amount of data in the individual payloads and payload envelopes, wherein the transmitted one or more aggregated payloads and the session entries are configured for reconstituting the plurality of signals at the receiver.

2. The method according to claim 1, wherein the isolated region comprises a moving region.

3. The method according to claim 1, wherein aggregating the payloads comprises incorporating a portion of the respective payload envelope into the payload.

4. The method according to claim 1, wherein deriving the session entries comprises storing the session entries in a session table, wherein transmitting comprises transmitting the session table.

5. The method according to claim 1, wherein aggregating the payloads comprises assembling the payloads in a specific order, based on establishment of the connections, into the one or more aggregated payloads.

6. The method according to claim 5, wherein deriving the session entries comprises storing the session entries in a session table, wherein assembling the payloads in a specific order is based on a unique order number corresponding to each session entry, wherein transmitting comprises transmitting the session table and the specific order to the receiver.

7. The method according to claim 5, wherein the specific order references the respective connections.

8. The method according to claim 1, wherein receiving the plurality of signals comprises receiving and applying a quality of service (QoS) parameter for at least one of the plurality of signals.

9. The method according to claim 8, and comprising applying at least one of respective priorities and respective bandwidths to the at least two signals, in response to the QoS parameter.

10. The method according to claim 1, wherein the payloads have fixed lengths.

11. The method according to claim 1, wherein the payloads have variable lengths, and wherein aggregating the payloads comprises incorporating values of the lengths into the aggregated payload.

12. The method according to claim 1, wherein the different protocols are chosen from industry-standard protocols.

13. The method according to claim 1, wherein each of the session entries comprises a quality of service value, a type of service value, and a traffic shaping value.

14. Apparatus for transmitting signals, comprising:
    a backhaul infrastructure (BI) adapted to:
        receive a plurality of signals generated in or destined for an isolated region, at least two of the plurality of signals operating under different protocols, the plurality of signals encoding data packets comprising respective individual payloads and payload envelopes, wherein at least one of the payload envelopes comprises header data that is repeated in at least another one of the payload envelopes;
        derive a session entry for each set of the repeated header data from the payload envelopes, wherein each of the session entries comprises information regarding a connection upon which a subgroup of the data packets is transmitted;
        aggregate the payloads, separated from the respective data packets, into one or more aggregated payloads; and
        transmit the one or more aggregated payloads and the session entries via a satellite link to a receiver, wherein the receiver comprises a destination outside the isolated region or comprises the isolated region, the one or more aggregated payloads and the session entries comprising less data than an aggregated amount of data in the individual payloads and payload envelopes, wherein the transmitted one or more aggregated payloads and the session entries are configured for reconstituting the plurality of signals at the receiver.

15. The apparatus according to claim 14, wherein the isolated region comprises a moving region.

16. The apparatus according to claim 14, wherein aggregating the payloads comprises incorporating a portion of the respective payload envelope into the payload.

17. The apparatus according to claim 14, wherein deriving the session entries comprises storing the session entries in a session table, wherein transmitting comprises transmitting the session table.

18. The apparatus according to claim 14, wherein aggregating the payloads comprises assembling the payloads in a specific order, based on establishment of the connections, into the one or more aggregated payloads.

19. The apparatus according to claim 18, wherein deriving the session entries comprises storing the session entries in a session table, wherein assembling the payloads in a specific order is based on a unique order number corresponding to each session entry, wherein transmitting comprises transmitting the session table and the specific order to the receiver.

20. The apparatus according to claim 18, wherein the specific order references the respective connections.

21. The apparatus according to claim 14, wherein the BI is adapted to receive and apply a quality of service (QoS) parameter for at least one of the plurality of signals.

22. The apparatus according to claim 21, wherein the BI is adapted to apply at least one of respective priorities and respective bandwidths to the at least two of the plurality of signals, in response to the QoS parameter.

23. The apparatus according to claim 14, wherein the payloads have fixed lengths.

24. The apparatus according to claim 14, wherein the payloads have variable lengths, and wherein aggregating the payloads comprises incorporating values of the lengths into the aggregated payload.

25. The apparatus according to claim 14, wherein the different protocols are chosen from industry-standard protocols.

26. The apparatus according to claim 14, wherein each of the session entries comprises a quality of service value, a type of service value, and a traffic shaping value.

27. An apparatus for transmitting signals, comprising:
means for receiving a plurality of signals generated in or destined for an isolated region, at least two of the plurality of signals operating under different protocols, the plurality of signals, the signals encoding data packets comprising respective individual payloads and payload envelopes, wherein at least one of the payload envelopes comprises header data that is repeated in at least another one of the payload envelopes;
means for deriving a session entry for each set of the repeated header data from the payload envelopes, wherein each of the session entries comprises information regarding a connection upon which a subgroup of the data packets is transmitted;
means for aggregating the payloads, separated from the respective data packets, into one or more aggregated payloads; and
means for transmitting the one or more aggregated payloads and the session entries via a satellite link to a receiver, wherein the receiver comprises a destination outside the region or comprises the isolated region, the one or more aggregated payloads and the session entries comprising less data than an aggregated amount of data in the individual payloads and payload envelopes, wherein the transmitted one or more aggregated payloads and the session entries are configured for reconstituting the plurality of signals at the receiver.

28. The apparatus according to claim 27, wherein the isolated region comprises a moving region.

29. The apparatus according to claim 27, wherein means for aggregating the payloads comprises means for incorporating a portion of the respective payload envelope into the payload.

30. The apparatus according to claim 27, wherein means for deriving the session entries comprises means for storing the session entries in a session table, wherein transmitting comprises transmitting the session table.

31. The apparatus according to claim 27, wherein means for aggregating the payloads comprises means for assembling the payloads in a specific order, based on establishment of the connections, into the one or more aggregated payloads.

32. The apparatus according to claim 31, wherein deriving the session entries comprises storing the session entries in a session table, wherein assembling the payloads in a specific order is based on a unique order number corresponding to each session entry, wherein means for transmitting comprises means for transmitting the session table and the specific order to the receiver.

33. The apparatus according to claim 27, wherein means for receiving the plurality of signals comprises means for receiving and means for applying a quality of service (QoS) parameter for at least one of the plurality of signals.

34. The apparatus according to claim 33, and comprising means for applying at least one of respective priorities and respective bandwidths to the at least two of the plurality of signals, in response to the QoS parameter.

35. The apparatus according to claim 27, wherein the payloads have variable lengths, and wherein means for aggregating the payloads comprises means for incorporating values of the lengths into the aggregated payload.

36. The apparatus according to claim 27, wherein each of the session entries comprises a quality of service value, a type of service value, and a traffic shaping value.

* * * * *